United States Patent [19]

Bücher

[11] 4,399,540
[45] Aug. 16, 1983

[54] TUNABLE LASER OSCILLATOR

[75] Inventor: Hermann Bücher, Göttingen, Fed. Rep. of Germany

[73] Assignee: Lamba Physik Gesellschaft zur Herstellung von Lasern mbH & Co. KG, Göttingen, Fed. Rep. of Germany

[21] Appl. No.: 189,806

[22] Filed: Sep. 22, 1980

[30] Foreign Application Priority Data

May 10, 1979 [DE] Fed. Rep. of Germany ....... 2918863

[51] Int. Cl.³ ............................................. H01S 3/111
[52] U.S. Cl. ........................................ 372/20; 372/100
[58] Field of Search ............................ 372/20, 93, 102

[56] References Cited

U.S. PATENT DOCUMENTS

| | | | |
|---|---|---|---|
| 3,928,817 | 12/1975 | Chodzko | 372/102 |
| 4,127,828 | 11/1978 | Klauminzer | 372/102 |
| 4,229,710 | 10/1980 | Shoshan | 372/102 |
| 4,241,318 | 12/1980 | Comera et al. | 372/102 |

OTHER PUBLICATIONS

"Double-Frequency Dye Lasers With a Continuous Variable Power Ratio" by Chandro, *Optics Comm.*, vol. 31, No. 1, Oct. 1979.

"A Simple Beam Expander for Frequency Narrowing of Dye Lasers" by Hanna, *Optical and Quantom Electronics*, vol. 7, No. 2, 1975.

*Primary Examiner*—William L. Sikes
*Assistant Examiner*—Léon Scott, Jr.
*Attorney, Agent, or Firm*—Max Fogiel

[57] ABSTRACT

A tunable laser oscillator with a broadband emitting and thereby wavelength tunable laser medium. An optical resonator is provided for setting the wavelength of the laser radiation. Following the resonator is a device for spectral filtering and for producing a spectrally purer emitted laser radiation. An aperture is mounted in the path of the radiation following that device. The mechanism used for setting the wavelength of the laser radiation also forms the device for spectral filtering and for producing the spectrally purer emitted laser radiation. An optical arrangement is provided for feeding back the radiation leaving the resonator onto the joint mechanism and device.

11 Claims, 5 Drawing Figures

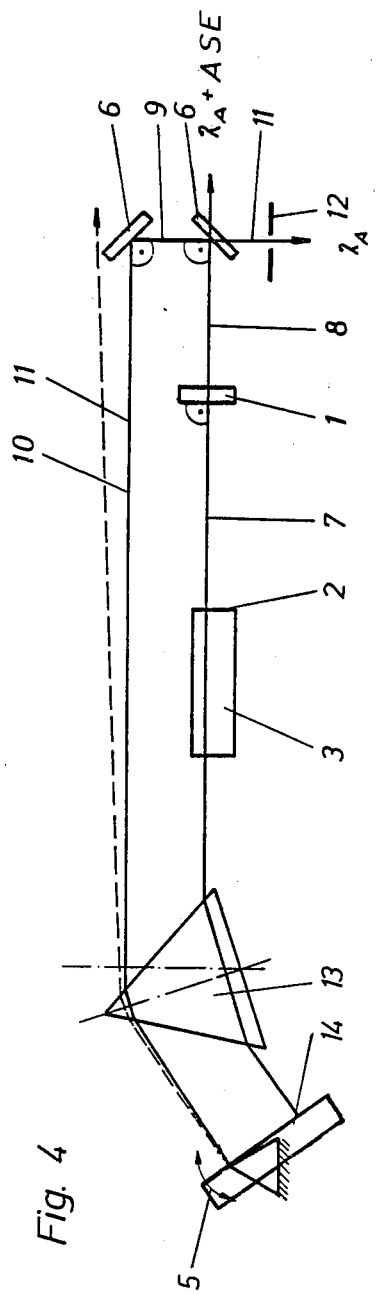
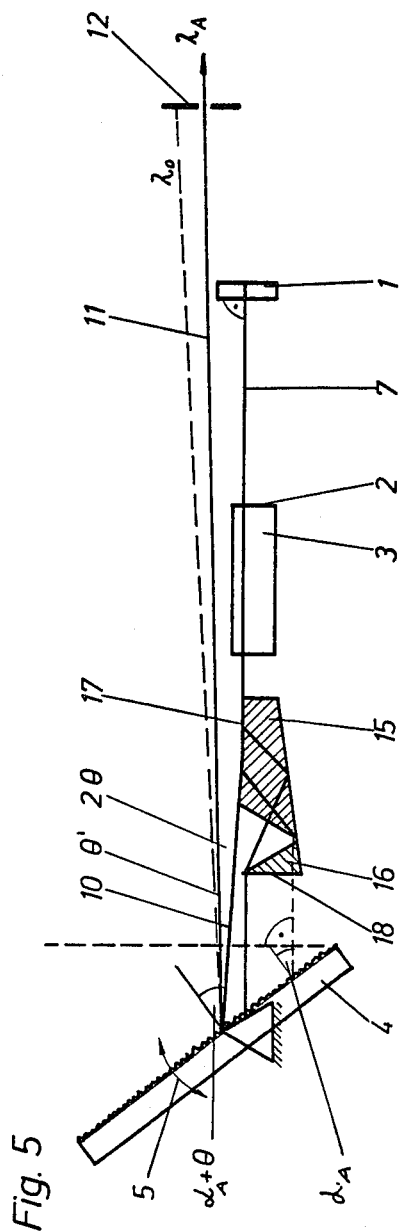
Fig. 4
Fig. 5

TUNABLE LASER OSCILLATOR

BACKGROUND OF THE INVENTION

The present invention is a tunable laser oscillator with a broadband emitting and thereby wavelength tunable laser medium. An optical resonator is provided with a mechanism for setting the wavelength of the laser radiation. A device immediately following the resonator for spectral filtering produces a spectrally purer emitted laser radiation. An aperture is mounted in the path of the radiation following the device. The aperture can be designed in several different ways.

The basic set-up of tunable lasers is generally known, for example, from the German laid-open publication DE-OS 27 15 844. They consist of a laser medium capable of broadband laser emission, for example a cell which is filled with a solution of organic dye and thus functions as the laser medium. This laser medium is excited by means of a pumping light source—for example, optical focusing elements. The laser medium in the cell is located within a tunable optical resonator, i.e., the resonator has a mechanism for setting the wavelength of the laser radiation. The optical resonator itself has an output coupling mirror and a back reflector mirror which are aligned to each other. The mechanism for setting the wavelength i.e. (the mechanism for tuning) consists of a rotating diffraction grating on a pivot. The diffraction grating also partially takes over the function of the back reflector mirror.

The spectral distribution of the laser emission i.e. the radiation which is coupled out of the resonator with the aid of the output coupling mirror, is broadband and thereby extends over a wavelength range. The laser radiation contains light from the wavelength selected with the wavelength tuning mechanism, but in addition it also contains broadband spontaneous radiation at a wavelength corresponding to the maximum amplification of the laser medium.

This broadband spontaneous radiation is known as ASE (Amplified Spontaneous Emission). The intensity of this broadband spontaneous radiation increases when, with the aid of the tuning mechanism, a wavelength is chosen which has at the end of the tuning curve, for example, one that is not amplified very well. However, the intensity of this broadband spontaneous radiation can also increase if the setting mechanism is not very effective, i.e., when very little light returns in the laser medium for amplification. In both cases, the energy not converted into the laser radiation of the tuned wavelengths will, to a large extent, be converted into broadband spontaneous radiation, ASE, since, due to the high amplification, only a small amount of light suffices to create a strong broadband spontaneous radiation.

If the laser beam is further amplified, then due to the reasons indicated, the relation of the intensity of the radiation of the tuned wavelength to the broadband spontaneous radiation, will deteriorate even further, if the tuned wavelength is in the low amplification range. The broadband spontaneous radiation, ASE, which arises in an interference nuisance factor since, generally speaking, the laser should be a light source where the laser radiation emitted is spectrally pure.

It is already known how to position a device for spectral filtering and for producing a spectrally purer emitted laser radiation behind the resonator of a tunable laser oscillator. (R. Wallenstein, T. H. Hansch in Optics Communications 14,353 (1975)). By this means, only the laser light of the tuned wavelength is further processed. The disadvantage of the known device is that the mechanism for setting the wavelength within the resonator and the device for spectral filtering and for producing spectrally purer emitted laser radiation following the resonator have to be tuned to each other synchronously. This means that not only the operation of this known tunable laser (from which the invention proceeds) is complicated, but also that its construction is quite expensive.

The object of the present invention is to provide an improvement of a tunable laser oscillator, as previously described, so that both the cost of construction and the method of operation would be simplified.

SUMMARY OF THE INVENTION

The objects of the present invention are achieved by having the mechanism for setting the wavelength of the laser radiation serve simultaneously as the device for spectral filtering, and for producing spectrally purer emitted laser radiation, and by providing the optical components for feeding back the radiation leaving the resonator on to the joint mechanism and device.

The present invention proceeds on the basis that the mechanism for setting the wavelength of the laser radiation, i.e., the tuning mechanism is at hand in any case and can be used simultaneously a second time as a device for spectral filtering and for producing a spectrally purer emitted laser radiation. Since the joint mechanism and device consists of one and the same setting element, the synchronous operation of two different elements—as in the known art—is eliminated. The cost of construction also decreases if an element which is already available or at hand is utilized two or more times. Thus the present invention is distinguished by the fact that the mechanism for setting the wavelength of the laser radiation also functions as a device for spectral filtering, and for producing a spectrally purer emitted laser radiation. Since the joint mechanism and device is used for two or more purposes, optical components for feeding back the radiation leaving the resonator have to be provided.

The joint mechanism and device can consist of a rotating optical diffraction grating which forms simultaneously a part of the resonator. Persons skilled in the art will certainly know in which plane or into what position relative to the output coupling mirror of the resonator, the diffraction grating has to be rotated. The joint mechanism and device can, however, also consist of a set of prisms for spectral dispersion followed by a rotating mirror. For practical purposes, it is best to mount the set of prisms in a piped position. Only the mirror is rotated. But the opposite arrangement of these elements is also possible.

The optical components for feeding back the radiation leaving the resonator on to the joint mechanism and device can either be a set of mirrors, a set of prisms or the like. This should be designed in such a way that it either directs the radiation parallel to the resonator axis at the joint mechanism and device, or that it directs the radiation in such a way that the radiation deviates only insignificantly from this parallelism. In the case of a parallel direction, the part of the spectrally purer emitted laser radiation destined for further processing escapes, for example, through the output coupling mirror. If the direction of the radiation deviates slightly from parallelism—this will amount to only a few degress at the most. Thus, the part of the spectrally purer emitted laser radiation destined for further processing, escapes the diffraction grating, or the set of prisms in a definite direction, whereas the broadband spontaneous radiation is reflected in another direction.

The optical components for feeding back the radiation can be mounted within or onto the outside of the resonator. Thus it is possible for the optical components for feeding back the radiation leaving the resonator on the joint mechanism and device, to be a set of prisms mounted within the resonator between the laser medium and the joint mechanism and device. This set of prisms has an entrance plane and an exit plane which are located relative to each other so that the beam reflected on the entrance plane is either parallel or almost parallel (insignificant deviation) to that of the beam passing through the set of prisms and the exit plane.

The deviation from parallelism can be directed towards the axis of the resonator. This form of construction has the advantage that the spectrally purer laser radiation emitted, passes through the laser medium twice and thus is amplified.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a schematic view of a further embodiment of the tunable laser oscillator; and FIG. 5 shows a schematic view of a still further embodiment of the tunable laser oscillator;

DESCRIPTION OF THE PREFERRED EMBODIMENTS

Figure 1:
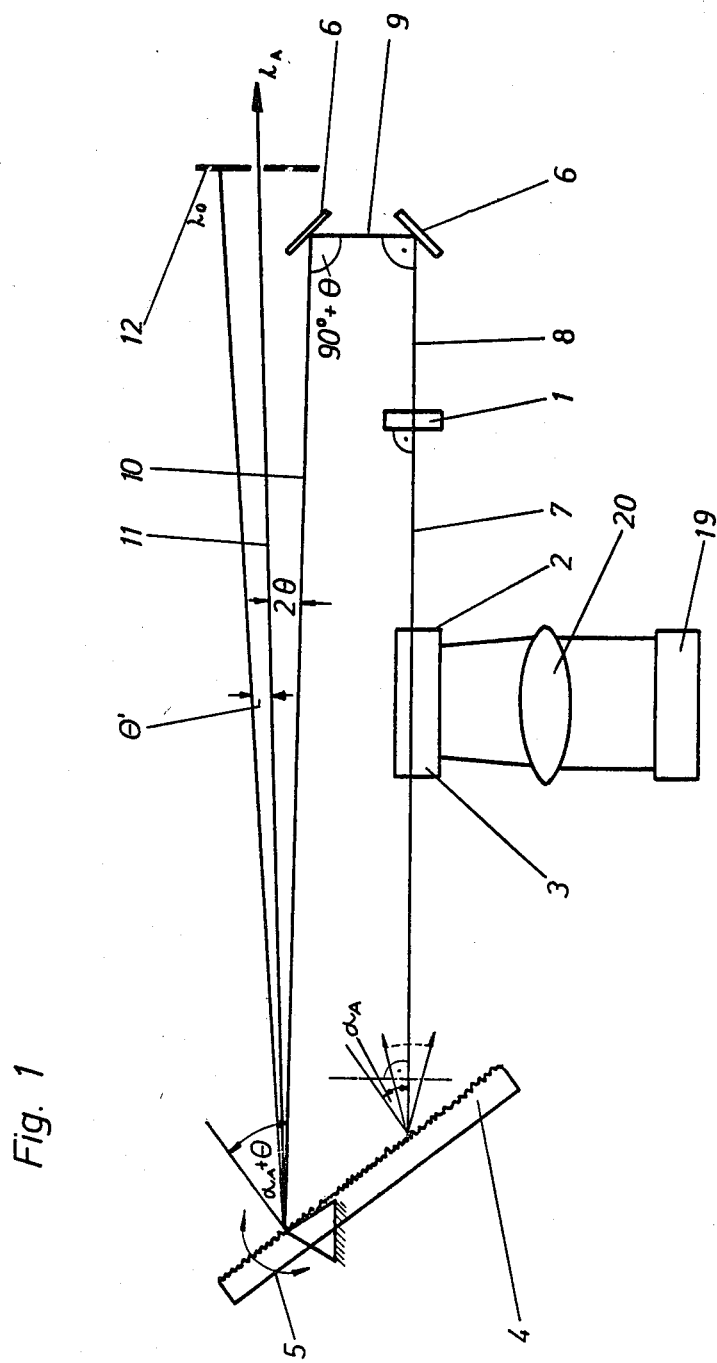
FIG. 1 shows a schematic view of one embodiment of the tunable laser oscillator according to the present invention.

In FIG. 1, an output coupling mirror 1 is shown in the path of radiation, mounted at a right angle to the indicated beam. The reflection of this output coupling mirror is less than 100%. The laser medium 3, for example, a solution of organic dyes, is in a container 2, for example a cell, which is arranged directly in the path of the beam. A diffraction grating 4 which rotates in a pivot represents on the one hand the tuning element, i.e. the mechanism for setting the wavelength of the laser radiation and on the other hand, it also represents the device for spectral filtering and for producing a spectrally purer emitted laser radiation. This diffraction grating 4 simultaneously forms a part of the resonator 1, 4, i.e., it corresponds to the output coupling mirror. This diffraction mirror 4 acts as a mirror at the respective angle set corresponding to the tunable wavelength.

The following is valid for this wavelength $\lambda_A$ $$\lambda_A = 2 \sin \alpha_A X K^{-1}$$

where K is the grating constant of the diffraction grating 4. Thus laser radiation 7 is also reflected back and forth within the resonator 1, 4. A small portion escapes through the output coupling mirror 1 and strikes a set of mirrors 6. The laser beam 8 leaving the resonator 1, 4 is reflected by the first mirror of the set of mirrors 6 at a 90° angle into beam 9, which in turn strikes the second mirror of the set of mirrors 6 from which it is reflected as beam 10. The second mirror of the set of mirrors 6, however, is mounted in such a way that beams 9 and 10 form an angle with each other. This angle is slightly larger than 90°. The set of mirrors 6 forms the optical components for feeding back the radiation 8 leaving the resonator 1, 4. As can be seen, beam 10 is in turn returned to the diffraction grating 4 which this time acts as a mechanism for spectral filtering and for producing the spectrally purer emitted laser radiation 11 of the wavelength $\lambda_A$. The diffraction grating 4 disperses laser beam 10 and separates the light of the tuned wavelength $\lambda_A$ from the broadband spontaneous radiation (ASE) of the wavelength $\lambda_A$. This stray light is stopped by aperture 12 so that only the spectrally filtered laser radiation emitted 11 is further processed.

If, as shown, laser beam 10 is reflected on to diffraction grating 4 through the set of mirrors 6 so that the following is valid for its angle of incidence, $$\lambda_A = 2 \sin (\alpha_A + \theta)$$

then the light of the tuned wavelength $\lambda_A$ will be reflected with the deviation 2. If the angle is small ($\theta = 1°$ to 2°), then $\theta$ is independent of wavelength and the light of wavelength $\lambda_A$ will pass through aperture 12, independent of the angle which is changed during tuning according to the above equation. Light from deviating wavelengths which is part of laser radiation 10, is reflected from grating 4 at angle $\theta + 2\theta$ and is stopped by aperture 12. In this way, diffraction grating 4 fulfills the additional task of only filtering the light of tuned wavelength from laser light 8, 9 and 10 and of always sending it in the right direction no matter what wavelength has been set. Thus diffraction grating 4 represents both the mechanism for setting the wavelength of the laser radiation and the device for spectral filtering and for producing a spectrally purer emitted laser radiation. The grating tuning as well as subsequent filtering are inevitably synchronous since diffraction grating 4 can only be rotated as a whole.

For further clarification, the pumping light source 19 as well as the focusing lens 20 are also indicated in FIG. 1.

Figure 2:
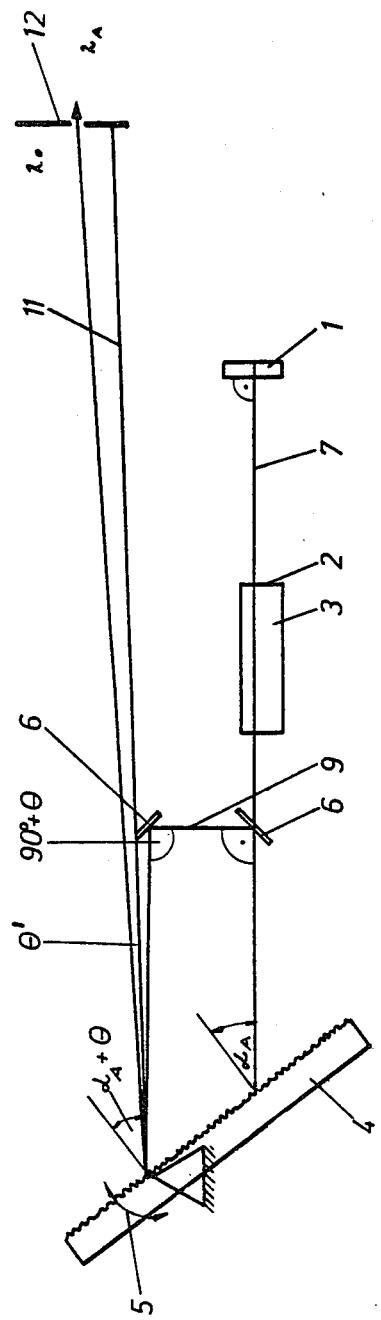
FIG. 2 shows a second embodiment of the tunable laser oscillator.

FIG. 2 shows a further embodiment in the form of a schematic diagram. As opposed to the embodiment in FIG. 1, the set of mirrors 6 here is mounted within the resonator 1, 4. The reflection of the output mirror 1 can be 100% = R = $\theta$.

There are a number of possibilities for de-coupling within the resonator 1, 4 with the set of mirror 6. Half-transparent mirrors, polarizers, etc. can be used for this purpose.

Figure 3:
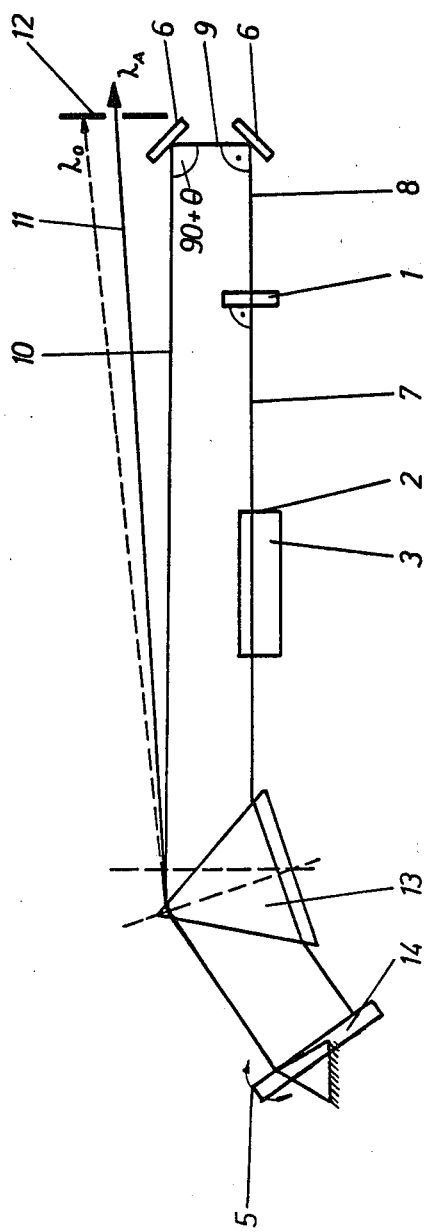
FIG. 3 shows a schematic view of a third embodiment of the tunable laser oscillator.

In the embodiment shown in FIG. 3, instead of a diffraction grating, a prism 13 and a mirror 14 are provided. The mirror 14 is mounted in such a way that it rotates in the direction of arrow 5, whereas, for practical purposes, prism 13 is mounted in a piped position. It must be pointed out that the set of mirrors 6 here also deviates from parallelism—as is also the case for the embodiments in FIGS. 1 and 2. Here prism 13 is a dispersing element, whereas mirror 14 reflects. Naturally, mirror 14 is also a part of the resonator. By means of this embodiment, the joint mechanism and device 13 and 14 is also used twice. The broadband spontaneous radiation ASE is filtered out during the second time so that only spectrally purified radiation 11 of the tuned wavelength $\lambda_A$ is further processed. Of course, instead of the one prism 13, a set of prisms can be used.

The embodiment shown in FIG. 4 differs from that of FIGS. 1 to 3 in that the second mirror of the set of mirrors 6 is arranged so that a right angle is formed between beams 9 and 10—as is already the case for beams 8 and 9 on the first mirror of the set of mirrors 6. This means that beam 10 and beam 11 coincide, i.e., they reflect upon each other, so that on the first mirror of set of mirrors 6, light from the tuned wavelength and the broadband spontaneous radiation (ASE) are present whereas only the light of the tuned wavelength reaches aperture 12 for further processing. In fact, in the embodiment in FIG. 4, the resonator mirror 1 is not necessary and its function can also be taken over by the joint mechanism and device. The formation of radiation not tuned to the wavelength within the resonator is even more effectively suppressed.

In the embodiment shown in FIG. 5, a set of prisms 15, 16 is mounted between cell 2 and diffraction grating 4. The set of prisms, which can include more than 2 prisms, has an entrance plane 17 and an exit plane 18 which are positioned relative to each other. In fact, the set of prisms 15, 16 is formed in such a manner that the light beam reflected by entrance plane 17 and the light beam passing through the prisms and leaving the set of prisms at the exit plane 18, are parallel or almost parallel to each other. Diffraction grating 4 is oriented opposite plane 18 in such a way that the exit beam strikes the grating by angle $\alpha_A$ with $$\sin \alpha_A = \tfrac{1}{2} X \lambda \alpha_A X K^{-1}$$

Once again, diffraction grating 4 rotates on a pivot. Here diffraction grating 4 also forms the joint mechanism and device together with set of prisms 15, 16, whereas the entrance plane 17 represents the optical components for feeding back of the radiation leaving the resonator.

First, laser radiation 7 passing through dye solution 3 is refracted into prism 15 and appears, after leaving exit plane 18 at angle $\alpha_A$ on diffraction grating 4. As shown, set of prisms 15, 16 expands the beam.

The radiation coupled out at entrance plane 17 is returned feed back to the diffraction grating 4 in such a manner that it appears at angle $\alpha + \theta (0 < \theta < 1° - 2°)$ and is spectrally dispersed. The degree of output R is $$R_{11} = \left(\frac{n - M}{n + M}\right)^2 \text{ and } R_1 = \left(\frac{nM - 1}{nM + 1}\right)^2.$$

$R_\parallel$ applies to light polarized to the plane of incidence. $R_\perp$ applies to light polarized vertical to the plane of incidence. Where n is the index of refraction of the prism material and M is the magnification of the beam dimension in the plane of incidence of the beam refracted in the prism.

In addition to decoupling, set of prisms 15, 16 between cell 2 and diffraction grating 4 can also serve to expand the beam (telescope with one-dimensional magnification) in order to increase the angle dispersion of diffraction grating 4 and/or to polarize the laser radiation.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A tunable laser oscillator with a broadband emitting and wavelength tunable laser medium, comprising: an optical resonator with means for setting the wavelength of the laser radiation; means in said resonator for spectral filtering and for producing a spectrally purer emitted laser radiation; aperture means mounted in the path of the radiation from said means for spectral filtering for stopping stray light and passing only spectrally filtered radiation; said means for setting the wavelength of the laser radiation also forming said means for spectral filtering and for producing the spectrally purer emitted laser radiation; and optical means for feeding back the radiation leaving the resonator on to said means for spectral filtering, said means for setting the wavelength of the laser radiation comprising a single device with said means for spectral filtering so that synchronization of said means for setting the wavelength in accordance with said means for spectral filtering is avoided.

2. A tunable laser oscillator according to claim 1, wherein said means for spectral filtering comprises a rotating optical diffraction grating which is simultaneously part of said resonator.

3. A tunable laser oscillator according to claim 1, wherein said means for spectral filtering comprises a set of prisms for spectral dispersion followed by a rotating mirror.

4. A tunable laser oscillator according to claim 2 wherein said optical means has means for directing the radiation substantially parallel to the resonator axis at said means for spectral filtering.

5. A tunable laser oscillator according to claim 2, wherein said optical means comprises a set of prisms mounted within said resonator between the laser medium and said means for spectral filtering; said set of prisms having an entrance plane and an exit plane which are relative to each other so that the beam reflected on the entrance plane is substantially parallel to the beam passing through said set of prisms and said exit plane.

6. A tunable laser oscillator according to claim 4, wherein deviation from parallelism is directed forward of the axis of the resonator.

7. A tunable laser oscillator according to claim 6, wherein emitted spectrally purer laser beam passes through the laser medium a second time and is thereby amplified.

8. A tunable laser oscillator according to claim 4 wherein said optical means comprises a set of mirrors.

9. A tunable laser oscillator according to claim 4 wherein said optical means comprises a set of prisms.

10. A tunable laser oscillator as defined in claim 3, wherein said optical means comprises a set of prisms mounted within said resonator between the laser medium and said means for spectral filtering; said set of prisms having an entrance plane and an exit plane which are relative to each other so that the beam reflected on the entrance plane is substantially parallel to the beam passing through said set of prisms and said exit plane.

11. A tunable laser oscillator according to claim 1, wherein said means for spectral filtering comprises a rotating optical diffraction grating which is simultaneously part of said resonator, said optical means having means for directing the radiation substantially parallel to the resonator axis at said means for spectral filtering, deviation from parallelism being directed forward of the axis of the resonator, emitted spectrally pure laser beam passing through the laser medium a second time and being thereby amplified, said optical means comprising a set of mirrors.

* * * * *